United States Patent [19]

Dickson et al.

[11] Patent Number: 4,632,335
[45] Date of Patent: Dec. 30, 1986

[54] TAPE CASSETTE REWINDING MACHINE

[76] Inventors: Edward J. Dickson, The Terrace, 70 Mutual Street, Toronto, Ontario, Canada, M5B 2B1; Richard J. Armstrong, 17 Alcorn Avenue, Toronto, Ontario, Canada, M4V 1E5

[21] Appl. No.: 842,793

[22] Filed: Mar. 24, 1986

[51] Int. Cl.⁴ .................. G11B 15/32; G11B 23/04
[52] U.S. Cl. .................. 242/200; 235/435; 360/132
[58] Field of Search .................. 242/197–200, 242/55.19 A; 360/132, 137; 235/435, 436, 444, 475, 486

[56] References Cited

U.S. PATENT DOCUMENTS

| | | | |
|---|---|---|---|
| 4,406,426 | 9/1983 | Crandall | 242/197 |
| 4,512,535 | 4/1985 | Dickson et al. | 242/200 |
| 4,575,778 | 3/1986 | Vogelgesang | 360/132 |
| 4,586,101 | 4/1986 | Vogelgesang | 360/132 |

Primary Examiner—John M. Jillions
Attorney, Agent, or Firm—Fetherstonhaugh & Co.

[57] ABSTRACT

The invention is a machine for receiving a tape cassette, the tape of which has been wound on the take up reel of the cassette. The cassette has a clutch that must be released before the tape can be rewound. The machine comprises a read-head underlying the cassette location on the machine for reading a serial number on a cassette; a host computer with storage for cassette serial numbers and for unlock codes related to the serial numbers for a plurality of cassettes; an unlock head responsive to receipt of an unlock code from the host computer to engage the rollers in the roller cage of a cassette in the machine to move all of them to an inoperative position and release the reel for rotation with respect to the cassette in either direction; said host computer being responsive to receipt of a serial number read from said read head to transmit the unlock code for the serial number received to said unlock head; a rewind motor operable to rewind the tape from the reel on the free shaft to the reel on the drive shaft when the unlock head frees the take up reel for rotation.

9 Claims, 9 Drawing Figures

TAPE CASSETTE REWINDING MACHINE

The invention is concerned with a machine that will receive a tape or wire cassette that has one of its reels releasably locked against rotation, read a serial number on the cassette, retrieve from a memory the unlock code for that serial number to unlock the reel against rotation and operate an unlock head to release the locked reel for rotation in both directions whereby to permit the machine to rewind the tape or wire from one reel to the other. It is contemplated that the invention could be used with the type of reel described in U.S. Pat. No. 4,512,535 dated the 23rd day of April, 1985. The general type of the cassette and reel described in that specification will be described in the present specification. It is also contemplated that the machine will have application to other types of cassettes having releasable locking means for locking one of the reels against rotation with respect to the cassette casing in only one direction when operative.

The machine of this invention is capable of reading a serial number from a cassette, transmitting the serial number to a host computer which contains an unlock code for the cassette that is related to the serial number. The computer matches the read serial number and the stored unlock code and transmits the unlock code to an unlock head located on the machine under the cassette. Upon receipt of the unlock code, the unlock head operates to engage the rollers and move them all to an inoperative position whereby to release the reel for rotation with respect to the cassette in either direction. The reel can then be rewound. It is significant that the invention is that the host computer can serve many machines and can be remotely located from the cassette.

The machine can be made in a very simple design and with it one computer can service many reading head-/unlocking head combinations. The host computer also records the transmittal of the unlock head so that there is a record of how many times the particular cassette has been released for a particular rewinder. This is the basis for billing.

The machine is capable of processing a large number of combinations and of working on a binary number system.

According to the invention for releasing a releasable locking means of a machine for releasing the releasable locking means of a tape or wire cassette, the cassette having a casing and reels mounted for rotation within the casing and being connectable to a rotable drive shaft to transfer tape from the take up reel to the supply reel, the said cassette being characterized by releasable locking means for locking one of its reels against rotation with respect to its casing in only one direction when operative, said locking means being releasable to render it inoperative and to permit its respective reel free rotation in either direction with respect to its casing, said locking means including rollers in an annular roller cage and being releasable by manipulation of said rollers in said roller cage in accordance with an unlock code; the said machine comprises a read-head underlying the cassette location on the machine for reading a serial number on a cassette; a host computer with storage for cassette serial numbers and for unlock codes related to the serial numbers for a plurality of cassettes; an unlock head responsive to receipt of an unlock code from the host computer to engage the rollers in the roller cage of a cassette in the machine to move all of them to an inoperative position and release the reel for rotation with respect to the cassette in either direction; said host computer being responsive to receipt of a serial number read from said read head to transmit the unlock code for the serial number received to said unlock head; a rewind motor operable to rewind the tape from the reel on the free shaft to the reel on the drive shaft when the unlock head frees the take up reel for rotation.

The drawings illustrate a cassette, generally indicated by the numeral 10, which has a supply reel 12 and a take up reel 14. In use, the cassette is mounted in a video machine and the tape is drawn past a video playing or recording head as it is taken from the supply reel to the take up reel. The tape can be rewound on the supply reel by reversing the tape drive. The general construction of the cassette and its use in a video tape machine is well known and not referred to in detail in this specification.

The cassette described herein has a clutch between the take up reel 14 and the casing of the cassette. The purpose of the clutch, while operative, is to permit tape feed in one direction only so that the tape can be wound onto the take up reel from the supply reel but cannot be rewound from the take up reel back to the supply reel unless the clutch is rendered inoperative. Alternatively, the clutch can be designed to lock the supply reel against rotation that permits transfer to the supply reel when operative and provision made for rendering the clutch inoperative for rewind. The former arrangement will be described in this specification.

As indicated, this specification is concerned with a machine for control of the rewinding the tape from the take up reel to the supply reel. The tape typically is a tape of a movie. The user of the tape has shown the movie on a video tape display screen whereby the tape has passed from the supply reel 12 to the take up reel 14. It is desired to rewind the tape so that the movie can be shown again but the take up reel 14 is locked against rotation in a direction that would permit a rewind. The purpose of the present machine is to release the locked reel and permit rewind.

Figure 3:
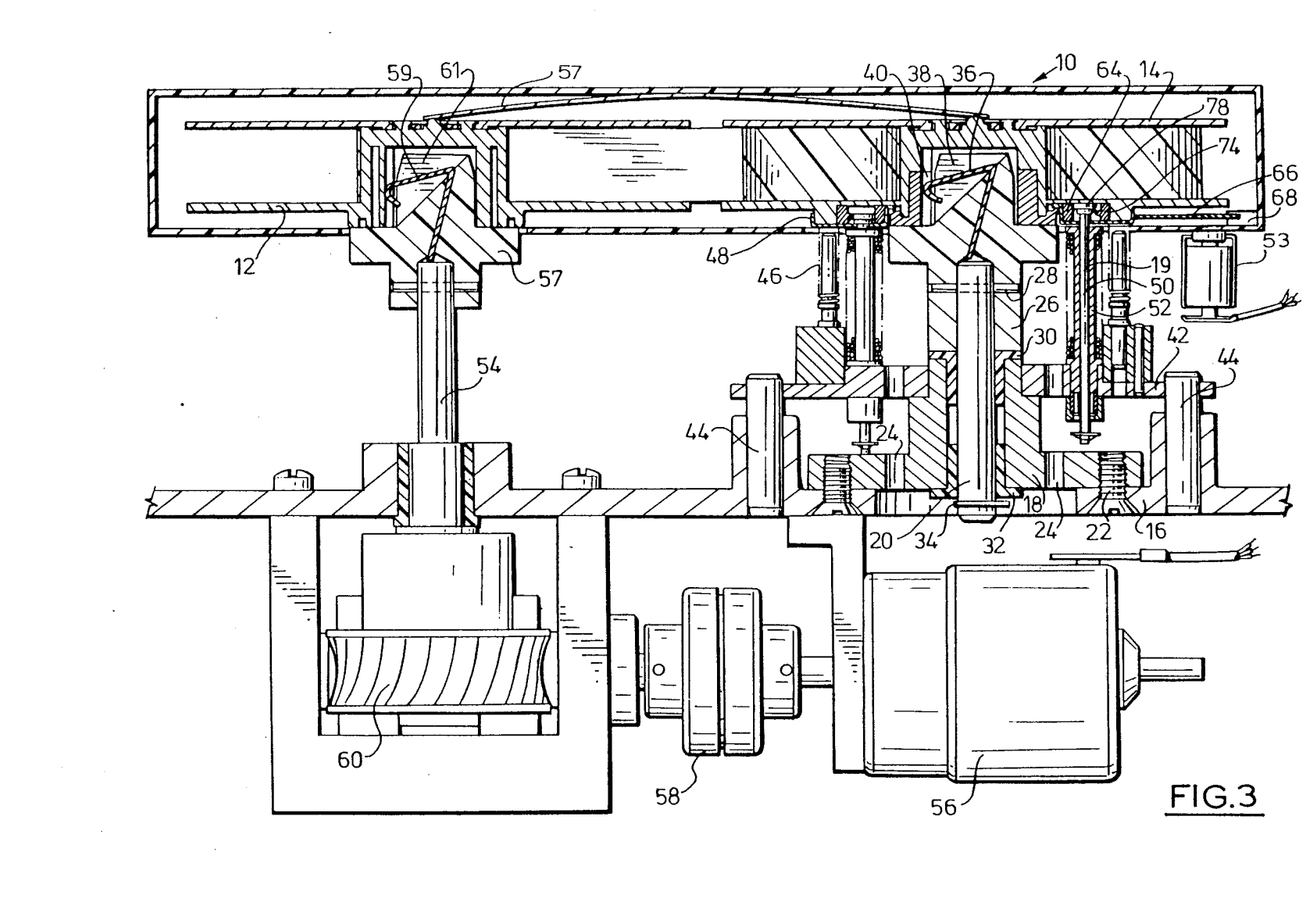
FIG. 3 is a sectional illustration of the principal parts of the head of a rewinder machine with a cassette in place illustrating the relative location of the mechanical parts.

FIG. 3 of the drawings is a sectional illustration of the head of a rewind machine showing the reels in position. The empty supply reel is on a spindle which is powered by motor 56 through coupling 58 and gear box 60 so that when the take up reel is released for rotation, the motor can be operated to freely rewind the tape from the take up reel 14 back to the supply reel 12.

The rewind machine on the take up reel side generally comprises a base 16 upon which is mounted the support column 18 for the idler shaft 20. The support column 18 is secured to the base by means of circumferentially spaced apart screws 22. The support column 18 is round in section across the view illustrated in FIG. 3. The numeral 24 represents two of circumferentially spaced apart holes bored through the support block 18 for the purpose of conducting the electrical wire leads to a control panel (not shown) that control the solarnoid coils for operating the pistons to release the locking means and that connect with the readers as will be referred to later.

Shaft 20 has an upper head 26 secured thereto by means of a pin 28 and rotates in nylon bearings 30 and 32 that are pressed fitted into the bore in the base 18 as illustrated. Numeral 34 refers to a spring washer for preventing the shaft from removal upwardly of its bearings 30 and 32. The plastics moulded head 26 on the upper end of the shaft 20 has a spring drive pin 36 that extends from a slot 38 therein to engage with a slot 40 on the inner side of the hub of the reel 14 to provide rotational interconnection between the reel 14 and the rotatable shaft 20. Thus, when the pin 36 engages in the slot 40, the reel is keyed to rotate within the bearings 30 and 32 of the base 18.

As will be referred to later, the reel 14 carries a serial number and also has on its underside access for a pin or the like for moving rollers in a roller cage of a clutch between the reel 14 and the casing 10 of the cassette to release the clutch and permit rotation of the take up reel with respect to the casing. The machine for rewinding the cassette has readers for reading the serial number and actuating pistons selected ones of which move into the roller cage to move the rollers that require movement in order to free the reel for rotation.

The readers 46 and the pistons 50 are supported on an annular table 42 that extends outwardly of a shoulder on the support sleeve 18. Numerals 44 refer to locating pins for the table 42 and they are placed at diametrically opposed locations on the table 42. The reading heads 46 are circumferentially spaced around the table to read the serial number which is marked on an annular retaining trough 48. The serial number in the embodiment of the invention illustrated extends for a full 360° of the retaining trough as will be referred to later, and is related to the positions of rollers in slots of the clutch hub.

Pistons which move the rollers that control the operation of the clutch are indicated by the numeral 50 and are controlled between one of two positions by means of an individually electrically operated solenoid 52. The solenoids 52 are circumferentially spaced around the support table 42 in alignment with the troughs of the roller cage so that when and if they are actuated in an upward position, they will engage with the roller in their respective trough. This operation will be referred to later in more detail.

Numeral 54 refers to a drive spindle which, in use, is powered from the motor 56 through flexible coupling 58 and crown gear box 60. Spindle 54 has a plastics moulded head 57, pin mounted to its upper end, and a spring drive pin 59 in a slot 61 to make a drive connection between a slot in the hub of the supply reel 12 of the cassette 10 and shaft 54.

In FIG. 3, the tape is illustrated as being fully transferred to the take up reel 14 and it is desired to rewind it back to the supply reel 12.

As explained, supply reel 12 is locked with respect to the casing of the cassette by means of a releasable clutch that grips between the casing 10 and the reel 14. The purpose of this machine is to release the locked condition of the clutch and permit rewind under controlled conditions.

Reference thus far has been to the detail of the machine. Reference will now be made to the construction of the cassette and, in particular, to the construction of the releasable clutch which, when engaged, prevents rotation of the take up reel 14 with respect to the cassette casing in a direction that would permit rewind.

Figure 4:
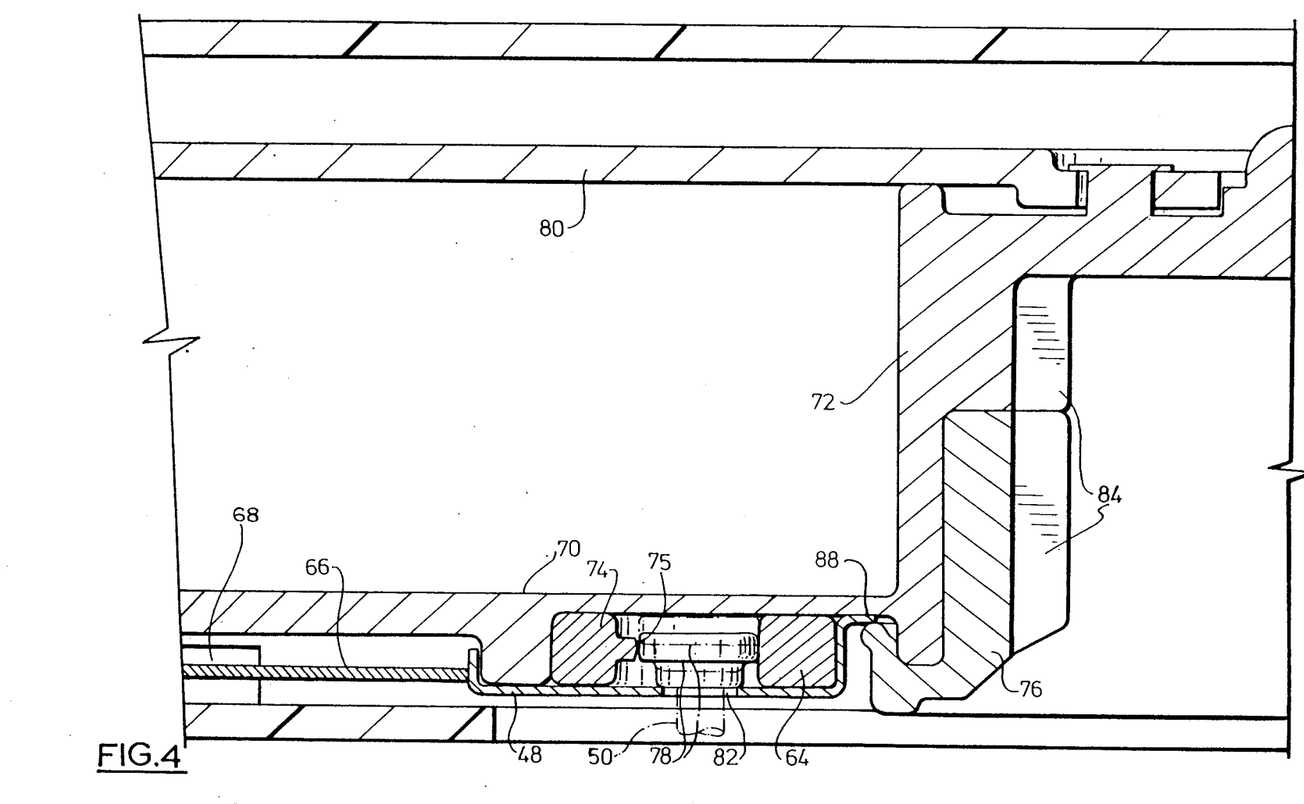
FIG. 4 is an enlarged illustration of the portion of FIG. 3.
Figure 5:
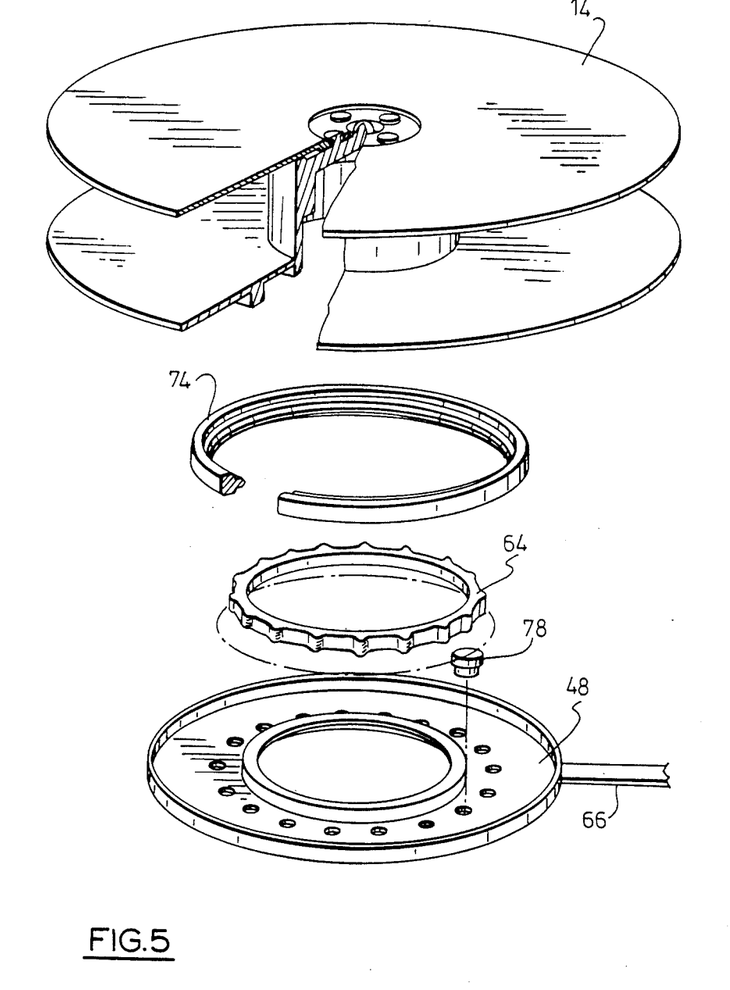
FIG. 5 is an exploded illustration of the take up reel clutch assembly less the bottom element of the hub.

The clutch assembly which includes the take up reel assembly with its clutch is illustrated in FIG. 5 in exploded form and includes three sub-assemblies. FIG. 4 is a detailed assembly.

The first sub-assembly is the annular code retaining ring 48 into which is pressed fitted the roller cage 64. Retainer trough or ring 48 has an arm 66 extending therefrom, the free end of which engages in a vertically extending slot in a block 68 of the cassette casing (see FIG. 3) whereby to stabilize the retaining trough 48 and its roller cage 64 against rotation with respect to the cassette casing 10 in use.

The second sub-assembly includes the lower flange 70 of the take up reel 14 which extends from the upper section 72 of the hub (See FIG. 4). The locking ring 74 is press fitted into the bottom of the lower flange 70 as indicated. Thus, the locking ring which will be referred to in more detail later, is secured with respect to the reel and rotates with the reel when the reel rotates.

The third sub-assembly of the take up reel is the lower hub section 76.

To assemble the reel, the lower hub section 76 is placed in a jig, the retainer trough 48 with its contained roller cage 64 is then placed in position; the rollers 78 are then placed in their respective channels of the roller cage. The lower reel flange 70 on the upper hub section with its assembled locking ring 74 is then pressed into position and finally the top flange 80 is pressed into position.

As will be explained the clutch is released when the narrow portion of every roller 78 is opposite the shallow braking surface of locking ring 74. To this end, the retaining trough 48 has a circumferentially extending series of holes 82 through which a plunger 50 can extend to move the rollers of the clutch longitudinally of their respective troughs to the release position. As will be explained it is only some of the rollers that require to be moved because others of the rollers are normally in the release position.

The hub of the reel consists of the sections 72 and 76. It has a series of radially extending slots 84 for engagement by the drive pin 36 as previously explained. The fit between the retaining trough 48, the lower reel flange 70 and the lower hub section 76 which embrace it as at 88 is a sliding one to permit relative rotation between the retaining trough 48 which is anchored to the cassette casing and the reel 14 which rotates with respect to the cassette casing.

The roller cage 64 has a series of axially aligned channels 88, each adapted to receive a cylindrical roller clutch element 78. Cylindrical roller clutch elements 78 are supported by the bottom of the retaining trough 48. They are restrained in the other direction by the bottom flange of the reel 14. They overlie a hole 82 in the retaining trough to permit engagement by a piston 50. Inwardly directed brake ring 74 has a shallow brake surface 75 that bears against the side of roller elements 78 to prevent rotation in one direction when the clutch is operative. The parts described with the exception of the retaining trough 48 are made from a suitable plastics material. Trough 48 is preferably made from metal such as brass.

In FIG. 4 roller element has been shown with its portion of wide diameter in breaking engagement with the braking surface 75 of the brake ring 74. It assumes the position illustrated in FIG. 4 by gravity when the cassette is placed on a rewind machine. In the event that the cassette should be upturned, the large diameter of the roller will rest against the reel but it will not become misaligned in its channel in an axial direction because the total longitudinal length of the large diameter of the roller is slightly greater than the space above the brake surface 75 of the brake ring 74. It will be noted that surfaces are cut away at their edges to provide for freedom of movement and guidance in this respect and to ensure that when the cassette is placed on a machine and in the position of FIG. 4, the roller will always assume its operative position against the retaining trough 48 as illustrated in FIG. 4.

It will also be noted that if the roller were put in upside down to what is illustrated in FIG. 4, the narrow portion of the roller would be opposite the braking surface 75 of the brake ring 74 and there would be no binding contact between the roller and the brake ring for that particular roller under conditions of operation.

Figure 6:
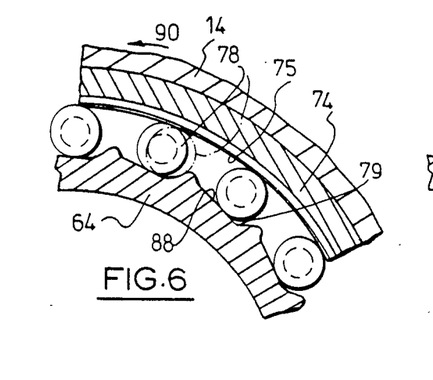
FIG. 6 is a partial sectional view through the clutch assembly of the take up reel illustrating the operation of the rollers.
Figure 7:
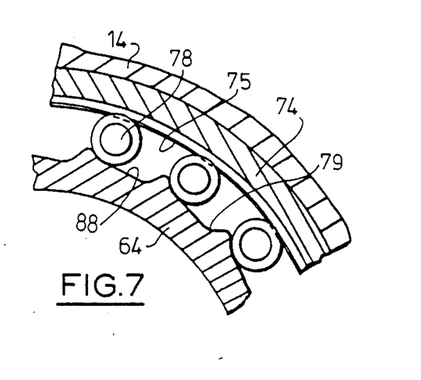
FIG. 7 is an illustration showing the rollers of the clutch assembly are mounted in the other position and are inoperative.
Figure 8:
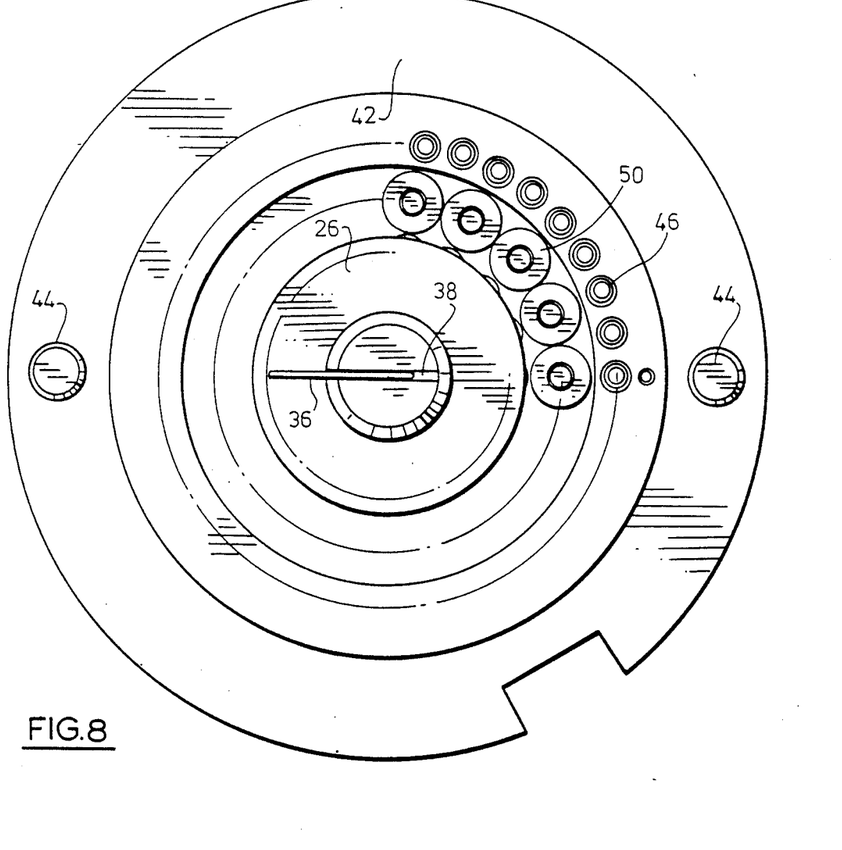
FIG. 8 is a plan view of the machine head with the cassette removed.
Figure 9:
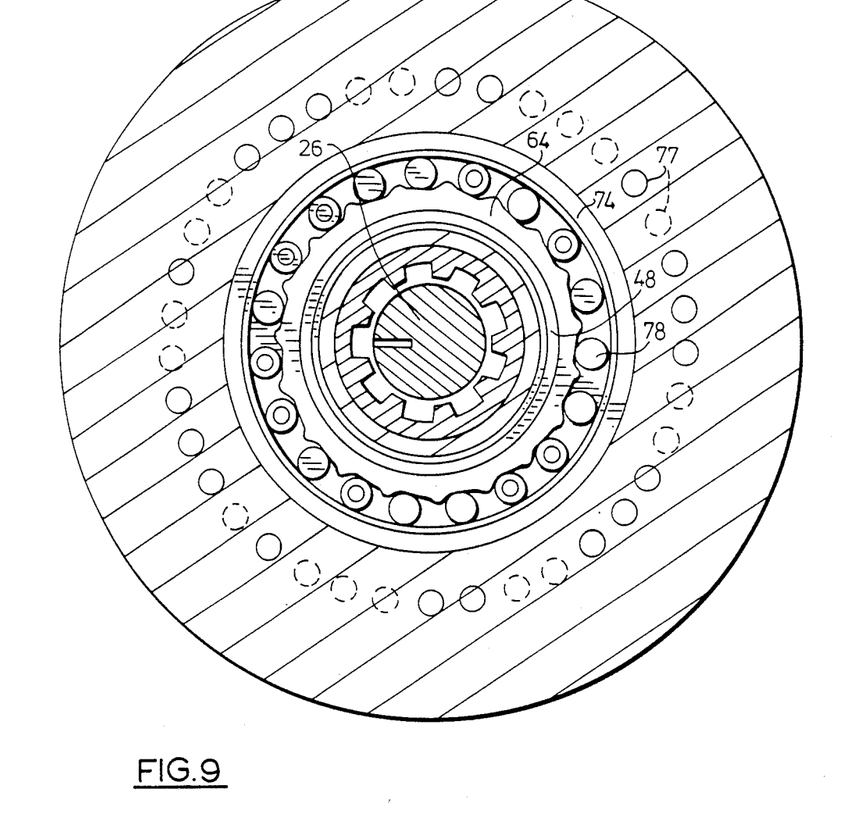
FIG. 9 is a sectional view through the clutch assembly of a cassette along the line 9—9.

FIGS. 6 and 7 illustrate the operation of the clutch. FIG. 6 shows channels 79 which house the rollers 78. The channels 88 have a flat ramp surface at their bottom. The rollers illustrated in FIG. 6 are each disposed as illustrated in FIG. 4. When a force is applied to rotate the reel 14 in the lock direction as indicated by the arrow 90, the rollers 78 wedge between the braking surface 75 of locking ring 74 and the ramp surface 88 to lock the reel against further rotation with respect to said housing.

When the reel is rotated in the opposite or free wheeling direction, the rollers 78 tend to move in the direction of rotation and become freely spaced between their respective channels 79 and the locking surface 75 of the locking ring 74 so that rotation is possible. The dotted line position of the middle roller 78 illustrates an extreme free position of the rollers on the ramp. In use, they do not move this far to the right. They move to the right and down their respective ramp only in sufficient distance to permit free rotation of the reel.

The design of the rollers, surfaces of the roller cage, the ramp and ring 74 under these conditions is according to standard roller clutch design practice.

In FIG. 6 each of the rollers 78 have been illustrated in the position shown in FIG. 4. In FIG. 7, the rollers have been shown in the opposite disposition, i.e. with the portion of large diameter resting on the retaining trough 48 and the portion of smaller diameter opposite with the braking surface 75 of the braking ring 74. In this disposition there is no braking action between the rollers and the braking ring.

The clutch assembly can be released to permit free rotation of the reel in either direction by moving all rollers in locking position longitudinally of their respective channels 79 so that their portions of small diameter is opposite the brake surface 75 of the brake ring 74. The rollers illustrated are all of the same dimension. The only difference between them in the assembly being that some are inserted with their small diameter up and others with their small diameter down (see at left side clutch assembly of FIG. 3).

In use, with the present machine, the plungers 50 can be extended through the holes 82 of the cage channel to move those rollers not resting in an inoperative position to an inoperative position to release the clutch. They do this in response to machine operation as will be explained later.

As has been noted, the clutch rollers 78 have a large diameter and a small diameter and they can have only two normal positions longitudinally of their respective channels 79 of the cage 64. In one of the two positions, the large diameter is opposite the braking surface 75 of the brake ring 74 (FIG. 4). If any one of the roller members 78 is in this position, the clutch will lock the reel against rotation in one direction.

The other position is with the small diameter of the roller opposite the ring of the brake ring 74. In this position, the rollers will not bind against the brake ring and rotation in both directions is permitted.

The rollers are randomly inserted on assembly of the cassette and the random position of each roller is recorded so that it is known which one of the rollers must be moved upwardly to release the clutch. The set of actuators or plungers 50 can be caused to enter into the holes 82 underlying those rollers that are in a normal locking position to raise them to an unlocked position. Thus, by appropriate plunger operation, all rollers can assume an inoperative position.

A feature of this invention is the concentric disposition of the unlock heads and the read heads which contribute to the reliability with which the serial number and recordal of the appropriate plunger operation to cause all rollers to assume and inoperative position can be recorded on the cassette. The disposition of the rollers is recorded at the same time that the serial number is applied to the retaining trough during the assembly of the reel. Thus, upon assembly, the reel has marked on it a serial number and it has an unlock combination for releasing the clutch. These two things are stored on a computer and the machine for rewinding the cassette is provided with a reading unlock head that will read the serial number and transmit the serial number to the computer. The computer will retrieve the unlock code for the serial number and transmit it back to the read unlock head, which in turn will operate in response to the unlock code to release the clutch and permit rewind of the cassette. When an unlock code has been transmitted the computer records the fact of transmittal for that cassette and thus provides a permanent record of the fact that tape has been rewound. This is the information required to operate a tape rental business where a fee is charged for each running of a tape through a tape player.

The serial number is preferably applied to the outside of the retaining trough 48 in a circular arrangement radially outwardly of the openings that underlie the rollers 78. It has some thirty seven constituents 77, one for each of the 36 individual signal reading heads 46 plus one common return. Each constituent is adapted to overlie its respective reading head 46 when the cassette is in the machine. The serial number constituents 77 on the cassette are printed on the cassette and consists of an electrically conducting path which may or may not have an insulative break. The reading sensors 46 are able to sense whether or not their particular path is fully conducting through the common or has an insulative break in it. Thus, 36 of the 37 reading heads 46 of the machine determines whether or not its respective serial number constituent on the cassette is electricity conducting or non electricity conducting. The thirty seventh constituent is a common terminal. The read signal that indicates serial number consists of thirty six readings which indicate conducting or nonconducting. The serial number as read by the head as a whole is a digital type of signal.

The rollers 78 are inserted in one of two modes and their position as to mode is recorded and stored on a host computer together with the serial number. The computer is included in the machine of the invention and includes a read unlock head 90 that will read the serial number, transmit it through controller 92 to the computer 94 whereupon the computer relates the serial number to the stored unlock code for the serial number and transmits the unlock code back to the read unlock head 90 which operates the plungers 50 to actuate those rollers that require actuation to put them into an inoperative position. The unlocking code is also in binary form because the information transmitted to each of the plungers is merely a signal to operate the plunger or a signal to leave the plunger in its existing condition. The serial numbers and the unlock codes are each stored on the host computer. Numeral 57 is a leaf spring to hold the reels in place.

Figures 1, 2:
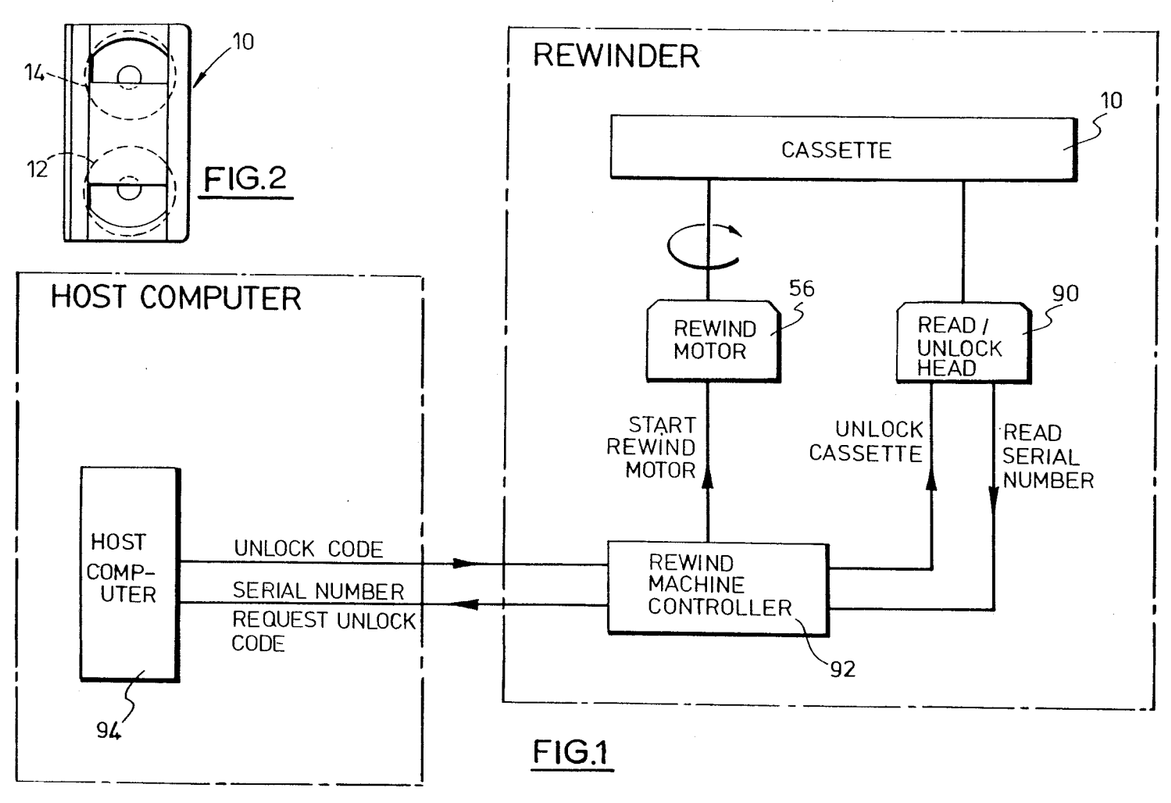
FIG. 1 is a schematic illustration of a cassette rewinder machine connected to a host computer for storing unlock codes for the clutches of cassettes.
FIG. 2 is an illustration of a tape cassette.

FIG. 1 is a schematic illustration of the machine and cassette. The reading heads 46, plungers 50, and their related circuitry constitute the read unlock head 90.

When the serial number is read and transmitted to the host computer 94, the host computer relates it to the unlock code for that serial number. The unlock code is transmitted back through the rewind machine controller 92 to the read unlock head where it operates the plungers 50 to release the clutch.

As explained above, the unlock code includes an input to the solenoids 52 of those plungers 19, the rollers 78 of which are in the binding clutch position. The input operates these plungers to raise their respective rollers to the inoperative position so that all plungers are in the inoperative position and the reel is free to rotate.

After the read unlock head has been operated to release the clutch, the rewind machine controller starts the rewind motor 56 to rewind the tape to the supply reel.

The rewind motor automatically shuts off when the rewind operation has been completed as a leader on the end of the tape passes a detecting head. This is a well known method of stopping motor rewind.

The electrical wiring of the reading heads 46 and the plungers 52 has not been illustrated because it is cumbersome to illustrate and well understood in the art. Electrical leads from each solenoid are fed through their respective table opening 24 in the base of the column 18 and formed into a control cable that is plugged into the rewind machine controller 92. Similarly, the leads from the reading heads 46 are made into a control cable and plugged into the rewind machine controller.

Rewind machine controller is a computer type controller of standard design programmed to do the things required and described herein.

Numeral 53 is a micro switch that signals the computer when the cassette is correctly placed.

The host computer is of standard design and large enough to store data to operate a multitude of rewinders. It would likely be remotely located from the machines in practice.

The machine has features that make it ideally suited to its use. In the operation of a business of renting movie tapes, the movies are made on large reels that contain several copies of the movie. They are separated and put on individual cassettes of the type described herein. The step of recording the serial number on the outside of the cassette and recording the unlock code on the host computer at the same time they are assigned to the cassette is of importance. These operations might well be separated in distance and time. They could be separated by miles and in distance and months in time. In these events, there is a danger of mismatching serial numbers and operating codes. If this should occur, the serial number transmitted from a cassette would not result in the proper matching unlock code being transmitted from the host computer to the read unlock head. Once the rollers 78 are placed in their channels there is no way of determining the combination if it is lost or not recorded incorrectly except reopening the cassette and recording their disposition. This would be entirely too costly a mismatched tape would result in scrapping of the cassette. In production, any error of this nature that occurred would likely result in the scrapping of thousands of cassettes because serial numbers are sequentially applied on a production line. The present recording machine therefore by reason of the nature of the disposition of the reading heads and the operating plungers and the interconnection thereof to the computer is of great practical significance in the operation of a business of renting cassettes with a one way locking clutch that must be released to permit rewind.

In the operation of a tape rental business there would be one host computer and a multitude of rewinders located at remote locations to the host computer. The interconnection between the host computer and the rewinders would be by telephone or like cable. The rewinder machines would be operated by agents who would be billed each time that a cassette was rewound because the rewinding of the cassette would permit the agent to rerent the tape to a user for playing on a tape playing machine. The host computer records the transmission of each unlock code to a particular rewinder and makes a record of the transmission of that unlock code transmission for a particular cassette to the account of the rewinder to which it was set. Billing is based on these transmissions.

The system has many advantages because it ensures the owner of the copyright in the material on the cassette that the material will be played only once for one fee. A further advantage is the fact that the user can play the cassette on a tape playing machine at any period of time after it has been rewound. The agent renting the tape need not be concerned about the time that the leasee takes to return the tape to him. Thus the machine permits the efficient operation of a tape rental business that employs copyright material on the tapes.

Embodiments of the invention other than the one illustrated will be apparent to those in the art.

What I claim as my invention is:

1. A machine for releasing the releasable locking means of a tape or wire cassette, the cassette having a casing and reels mounted for rotation within the casing and being connectable to a rotable drive shaft to transfer tape from the take up reel to the supply reel, the said cassette being characterized by releasable locking means for locking one of its reels against rotation with respect to its casing in only one direction when operative, said locking means being releasable to render it inoperative and to permit its respective reel free rotation in either direction with respect to its casing, said locking means including rollers in an annular roller cage and being releasably by entry of roller operating means into said roller cage in accordance with an unlock code; the said machine comprising:

a read-head underlying the cassette location on the machine for reading a serial number on a cassette;

a host computer with storage for cassette serial numbers and for unlock codes one related to each serial number for a plurality of cassettes;

an unlock head having roller operating means, said roller operating means being responsive to receipt of an unlock code for the cassette in the machine from the host computer to actuate the roller operating means to enter the roller cage of a cassette in the machine and engage the rollers in the roller cage of a cassette in the machine to move all rollers to an inoperative position and release the reel for rotation with respect to the cassette in either direction;

said host computer being responsive to receipt of a serial number read from said read head to transmit the unlock code for the serial number received to said unlock head;

a rewind motor operable to rewind the tape from the reel on the free shaft to the reel on the drive shaft when the unlock head frees the take up reel for rotation.

2. A machine for releasing the releasable locking means of a tape or wire cassette, the cassette having a casing and reels mounted for rotation within the casing and being connectable to a rotable drive shaft to transfer tape from the take up reel to the supply reel, the said cassette being characterized by releasable locking means for locking one of its reels against rotation with respect to its casing in only one direction when operative, said locking means being releasable to render it inoperative and to permit its respective reel free rotation in either direction with respect to its casing, said locking means including rollers in an annular roller cage and being releasable by entry of roller operating means into said roller cage in accordance with an unlock code as claimed in claim 1 wherein said roller operating means comprises a plurality of plungers, each mounted to enter the roller cage of a cassette in the machine; and plunger operating means for operating said plungers into the roller cage.

3. A machine for releasing the releasable locking means of a tape or wire cassette, the cassette having a casing and reels mounted for rotation within the casing and being connectable to a rotable drive shaft to transfer tape from the take up reel to the supply reel, the said cassette being characterized by releasable locking means for locking one of its reels against rotation with respect to its casing in only one direction when operative, said locking means being releasable to render it inoperative and to permit its respective reel free rotation in either direction with respect to its casing, said locking means including rollers in an annular roller cage and being releasable by entry of roller operating means into said roller cage in accordance with an unlock code as claimed in claim 2 wherein said plunger operating means is solenoid operated; each of said plungers having two positions in relation to a cassette in the machine, one of said two positions being a position wherein it enters the roller cage of a cassette in the machine to move a roller of the cassette to an inoperative position where the roller does not lock against rotation, the other position of the plunger being one where it does not manipulate the position of the roller of the cassette in the machine.

4. A machine for releasing the releasable locking means of a tape or wire cassette, the cassette having a casing and reels mounted for rotation within the casing and being connectable to a rotable drive shaft to transfer tape from the take up reel to the supply reel, the said cassette being characterized by releasable locking means for locking one of its reels against rotation with respect to its casing in only one direction when operative, said locking means being releasable to render it inoperative and to permit its respective reel free rotation in either direction with respect to its casing, said locking means including rollers in an annular roller cage and being releasable by entry of roller operating means into said roller cage in accordance with an unlock code as claimed in claim 2 wherein:

said read head has detectors; said plungers being in circular arrangement and said detectors being in circular arrangement concentric with said plungers and adapted to underlie and to read the constituents of a serial number on a cassette in the machine.

5. A machine for releasing the releasable locking means of a tape or wire cassette, the cassette having a casing and reels mounted for rotation within the casing and being connectable to a rotable drive shaft to transfer tape from the take up reel to the supply reel, the said cassette being characterized by releasable locking means for locking one of its reels against rotation with respect to its casing in only one direction when operative, said locking means being releasable to render it inoperative and to permit its respective reel free rotation in either direction with respect to its casing, said locking means including rollers in an annular roller cage and being releasable by entry of roller operating means into said roller cage in accordance with an unlock code as claimed in claim 1 wherein said rewind motor is operable as aforesaid in response to the operation of said unlock head when it releases said locking means.

6. A machine for releasing the releasable locking means of a tape or wire cassette, the cassette having a casing and reels mounted for rotation within the casing and being connectable to a rotable drive shaft to transfer tape from the take up reel to the supply reel, the said cassette being characterized by releasable locking means for locking one of its reels against rotation with respect to its casing in only one direction when operative, said locking means being releasable to render it inoperative and to permit its respective reel free rotation in either direction with respect to its casing, said locking means including rollers in an annular roller cage and being releasable by entry of roller operating means into said roller cage in accordance with an unlock code as claimed in claim 2 wherein;

said read head has detectors; said plungers being in circular arrangement, said detectors being in circular arrangement concentric with said plungers and adapted to underlie and to read the constituents of a serial number on a cassette in the machine; said constituents being identifiable by the reading head as being one of two kinds.

7. A machine for releasing the releasable locking means of a tape or wire cassette, the cassette having a casing and reels mounted for rotation within the casing and being connectable to a rotable drive shaft to transfer tape from the take up reel to the supply reel, the said cassette being characterized by releasable locking means for locking one of its reels against rotation with respect to its casing in only one direction when operative, said locking means being releasable to render it inoperative and to permit its respective reel free rotation in either direction with respect to its casing, said locking means including rollers in an annular roller cage and being releasable by entry of roller operating means into said roller cage in accordance with an unlock code as claimed in claim 2 wherein;

said read head has detectors; said plungers being in circular arrangements, said detectors being in circular arragement concentric with said plungers and adapted to underlie and to read the constituents of a serial number on a cassette in the machine; said constituents being identifiable by the reading head as being electricity conducting or not electricity conducting.

8. A machine for use with a computer for releasing the releasable locking means of a tape or wire cassette, the cassette having a casing and reels mounted for rotation within the casing and being connectable to a rotable drive shaft to transfer tape from the take up reel to the supply reel, the said cassette being characterized by releasable locking means for locking one of its reels against rotation with respect to its casing in only one direction when operative, said locking means being releasable to render it inoperative and to permit its respective reel free rotation in either direction with respect to its casing, said locking means including rollers in an annular roller cage and being releasable by entry of roller operating means into said roller cage in accordance with an unlock code;

the said machine comprising;

a read-head underlying the cassette location on the machine for reading a serial number on a cassette in the machine; and adapted to transmit a read serial number of a computer to which the machine is connected;

an unlock head having roller operating means, said roller operating means being responsive to receipt of an unlock code for the cassette in the machine from a computer to actuate the roller operating means to enter the roller cage of a cassette in the machine and engage the rollers in the roller cage of a cassette in the machine to move all rollers to an inoperative position and release the reel for rotation with respect to the cassette in either direction;

said unlock head having a circular configuration and underlying the roller cage, said read head also having a circular configuration that is concentric with the configuration of the unlock head.

9. A machine for use with a computer for releasing the releasable locking means of a tape or wire cassette, the cassette having a casing and reels mounted for rotation within the casing and being connectable to a rotable drive shaft to transfer tape from the take up reel to the supply reel, the said cassette being characterized by releasable locking means for locking one of its reels against rotation with respect to its casing in only one direction when operative, said locking means being releasable to render it inoperative and to permit its respective reel free rotation in either direction with respect to its casing, said locking means including rollers in an annular roller cage and being releasable by entry of roller operating means into said roller cage in accordance with an unlock code as claimed in claim 6 wherein said roller operating means comprises a plurality of plungers, each mounted to enter the roller cage of a cassette in the machine; and plunger operating means for operating said plungers into the roller cage.

* * * * *